United States Patent [19]
Coudrains et al.

[11] Patent Number: 5,087,466
[45] Date of Patent: Feb. 11, 1992

[54] PROCESS AND DEVICE FOR TREATING ANIMAL FLESH, PARTICULARLY FISH, FOR THE PURPOSE OF REMOVING COLOR AND ODOR

[75] Inventors: Louis Coudrains, Queven; Emmanuel Starck, Quimper, both of France

[73] Assignee: Compagnie des Eaux et de L'Ozone, France

[21] Appl. No.: 423,411
[22] PCT Filed: Mar. 18, 1988
[86] PCT No.: PCT/FR88/00141
  § 371 Date: Sep. 19, 1989
  § 102(e) Date: Sep. 19, 1989
[87] PCT Pub. No.: WO88/06848
  PCT Pub. Date: Sep. 22, 1988

[30] Foreign Application Priority Data
Mar. 19, 1987 [FR] France ............... 87 03793

[51] Int. Cl.$^5$ ............ A22C 25/02; A23B 4/16
[52] U.S. Cl. ................. 426/256; 426/312; 426/474; 426/488; 426/643; 99/467; 99/477; 99/516; 261/DIG. 42
[58] Field of Search ......... 426/643, 488, 256, 312, 426/474; 99/467, 477, 516; 261/DIG. 42

[56] References Cited
U.S. PATENT DOCUMENTS

| | | | |
|---|---|---|---|
| 3,682,314 | 8/1972 | Blatter | 261/DIG. 42 |
| 3,714,887 | 2/1973 | Johnson | 99/516 |
| 4,007,120 | 2/1977 | Bowen | 261/DIG. 42 |
| 4,128,052 | 12/1978 | Mueller et al. | 99/516 |
| 4,161,139 | 7/1979 | Van Deuren | 99/467 |
| 4,376,130 | 3/1983 | Astrack | 426/312 |
| 4,630,534 | 12/1986 | Tsuchiya | 99/516 |
| 4,849,237 | 7/1989 | Hurst | 426/474 |
| 4,900,481 | 2/1990 | Kishioka | 261/DIG. 42 |

FOREIGN PATENT DOCUMENTS

| | | |
|---|---|---|
| 3209930 | 9/1983 | Fed. Rep. of Germany . |
| 385815 | 5/1908 | France . |
| 797928 | 5/1936 | France . |
| 2021868 | 1/1990 | Japan ............... 426/312 |
| 2076562 | 3/1990 | Japan ............... 426/312 |

OTHER PUBLICATIONS

Yang, P. P. et al., Effects of Ozone Treatment on Shelf Life and Microflora of Poultry Meat, Abst. International Congress of Food Science and Tech., p. 262, 1978.
Patent Abst. of Japan, vol. 5, No. 200, Dec. 18, 1981, JPA 56121462.
"Unit Operations of Chemical Engineering", par McCabe et al., 3rd ed., McGraw-Hill Kogakusha Ltd., 1976, p. 609.
"Food Process Engineering", par P. Linko et al., vol. 1, Applied Science Publishers Ltd., 1975, p. 427.
"Perspectives internationales de l'emploi de l'ozone", par J-P. Legron, Stage No. 3 d'Insko, 0-10 Oct. 1980, Espoo, Finlande.
"Wasser", par Karl Höll, 7, Auflage, Walter de Gruyter, 1986, pp. 87-88.
"Encyclopedia of Chemical Technology", par Kirk-Othmer, 3rd ed., vol. 16, John Wiley & Sons, 1981, pp. 700-703.

Primary Examiner—Jeanette Hunter
Attorney, Agent, or Firm—Brumbaugh, Graves, Donohue & Raymond

[57] ABSTRACT

A process for treating animal flesh to remove color and odor. The flesh is mixed with water, then the mixture of flesh and water is placed in contact with ozone for a length of time to remove color and odor from the flesh.

17 Claims, 1 Drawing Sheet

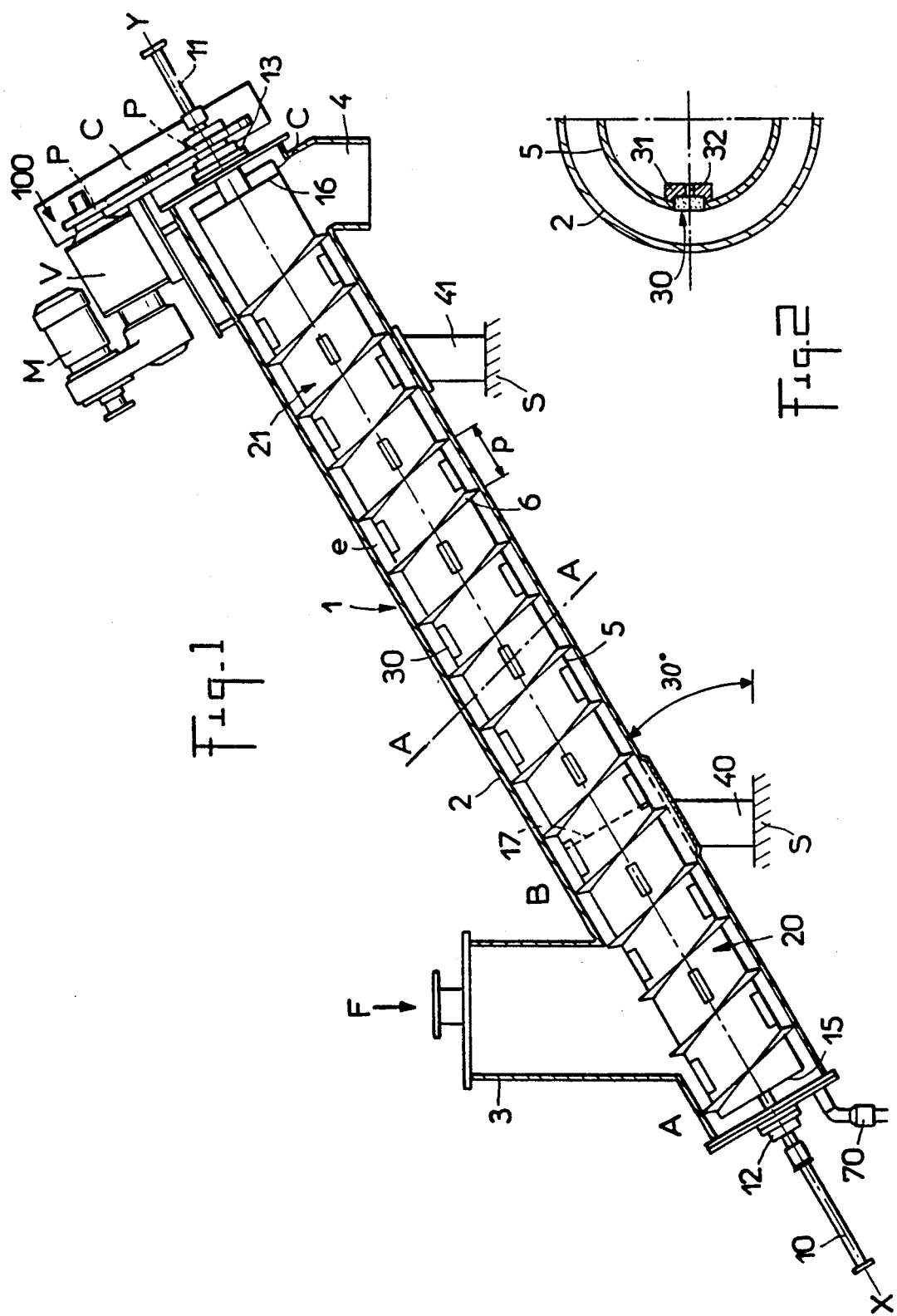

PROCESS AND DEVICE FOR TREATING ANIMAL FLESH, PARTICULARLY FISH, FOR THE PURPOSE OF REMOVING COLOR AND ODOR

BACKGROUND OF THE INVENTION

The invention relates to a process, particularly a continuous process, for treating animal flesh, for the purpose of removing color and odor. It further relates to the device for carrying out said process. The invention is more particularly applicable to the treatment of fish flesh.

One problem arising is that of the valorisation of the flesh which can still be recovered from carcasses, such as for example meat or fish bones, after the last boning or filleting operation. This problem is particularly important in industries converting sea products. For example after filleting of the fish (i.e. dividing it into fillets), there is left on the bones and the head a certain quantity of flesh which is worth saving. To detach that flesh from the bone or the head would be a lengthy and tedious operation. This explains why mechanical separation processes have been developed and this applies to meat, fish, shellfish, etc . . . .

Such processes, particularly those used for fish, permit the separation of the flesh left on the cartilage and bones for subsequent use as raw material in the preparation of various products.

Unfortunately, the flesh thus obtained has a more or less strong smell, depending on the fish, and an unsatisfactory color, depending both on its nature and on its content in residual blood, etc . . . .

Various process have already been proposed, all of which use ozone for sterilizing animal flesh, and in particular fish flesh, for the purpose of preparing a fish paste (Japanese Patent Application 56/121462).

But usually, the processes using ozone all had as their one or main purpose to sterilize the flesh and not to remove the color and also the odor.

If a certain amount of color or odor was removed, this was definitely insufficient, so that with time, the flesh could color again and bad smells could develop.

It is the object of the present invention to overcome the aforesaid disadvantages by proposing a process capable of acting both on the color of the flesh and on its odor, thus permitting a more effective valorization of the material, and improving the production of the products.

The invention also relates to a device adapted for the continuous treatment of animal flesh according to the invention.

Another object of the invention is to solve the new technical problem which consists in providing a process and a device for treating animal flesh, and in particular fish flesh, for the purpose of removing, continuously and completely, any odor and color therefrom, in a way which is extremely simple, reliable, readily adjustable, inexpensive, and usable on an industrial scale.

SUMMARY OF THE INVENTION

A first aspect of the invention is to provide a process for treating animal flesh which consists in placing the flesh, which has been mixed with water beforehand, in contact with ozone, characterized in that the flesh mixed with water is placed in contact with ozone for a long enough period to remove substantially completely any color and odor from the flesh.

According to one advantageous variant of the process of the invention, the duration of the treatment with ozone is at the minimum 4 minutes and preferably between 4 and 6 minutes.

According to another advantageous characteristic of the process of the invention, the treatment is carried out with ozone from an air containing between 10 and 15 g of ozone per $Nm^3$ of air.

According to yet another advantageous characteristic of the process of the invention, the treatment with ozone is carried out in two independent treatment zones, a first zone called "preozonification" zone and a second zone called "postozonification" zone.

According to a variant embodiment, the ozone flow, i.e. in practice the air containing ozone is introduced at a smaller volume flow rate in the preozonification zone compared with the volume flow rate in the postozonification zone.

For example, the air flow containing the ozone in the preozonification zone can be about equal to half the flow containing the air in the postozonification zone.

According to another characteristic of the process of the invention, the diameter of the bubbles of ozone injected in the water in which the flesh is immersed, is calibrated particularly by injecting the air containing the ozone through diffusers having pores of a calibrated diameter.

Said pore diameter may be predetermined, so as to allow only the passage of bubbles of ozone having a diameter less than about 2 to 4 mm.

It is also possible, according to another variant embodiment of the invention, to arrange for the air containing the ozone to be introduced into the diffuser through at least one calibrated orifice.

According to another characteristic of the process of the invention, it is also possible to arrange for the dwelling time in the preozonification zone to be longer than the dwelling time in the postozonification zone.

According to another variant of embodiment of the invention, it is possible to arrange for the dwelling time in the preozonification zone to be shorter than in the postozonification zone.

According to another advantageous characteristic of the process of the invention, the ozone moves in the preozonification zone and/or in the postozonification zone in reverse direction to the flesh.

According to another advantageous characteristic of the process of the invention, it is possible to arrange for the proportion of ozone expressed in g/kg of flesh to be between about 0.3 and 0.9, this leading to a very efficient color-and odor-removing treatment.

The invention also relates to a device adapted for the continuous treatment of animal flesh, according to said process.

A second aspect of the invention is to provide a device for treating animal flesh as defined in the device claims. Such device permits the implementation of the above-described process in an extremely simple and versatile manner, adaptable to all types and qualities of animal flesh, with very simple controls.

BRIEF DESCRIPTION OF THE DRAWINGS

The invention will be more readily understood on reading the following description with reference to the accompanying drawings, in which:

FIG. 1 is a general view of the device for carrying out the process according to the invention;

FIG. 2 is a a partial section along line AA of the device of FIG. 1.

For the sake of clarity, the same elements have been given the same references on all the figures.

DESCRIPTION OF THE PREFERRED EMBODIMENT

The process, capable of removing color and/or odor from animal flesh according to the invention, consists essentially in placing the flesh to be treated in contact with ozone for a long enough treatment period to remove all color and odor from the flesh. It is a known fact that this gas is found in the atmosphere but that it can also be obtained artificially when air is subjected to an electrical discharge. The ozone, by dessociating, releases a molecule and an atom of oxygen. This acts mainly at the level of the oxidation. The Applicants have noted that the action of ozone on the flesh and more particularly on fish flesh, causes a change of color, and a reduction, if not a total elimination of odor. The flesh is placed in contact with ozone by causing the ozone to bubble through in a mixture of flesh and water.

To obtain an optimum effect from the process, it is preferred to distribute the ozone in the form of bubbles of size as small as possible, capable of acting over as large a surface of the product to be treated as possible. It is therefore necessary, depending on the aimed result, to act upon a certain number of parameters, the main ones being the actual texture of the flesh and the quality of the diffusion of the ozone which must reach through to the totality of flesh particles.

FIGS. 1 and 2 diagrammatically illustrate a device (1) designed for carrying out the process according to the invention. Such a device (1) is constituted of an envelope (2) of axis (xy), equipped with a feed hopper (3) supplying the product to be treated and with an exit chute (4) for said product. The latter is introduced into the hopper (3) in the direction shown by arrow (F), by means of a booster pump, not shown in the drawings.

A hollow tube (5) turns inside said envelope (2) whose axis coincides with axis (xy). The gap (e) between the envelope (2) and said tube (5) constitutes the bubbling or treatment chamber containing the ozone. A helical wall (6) of predetermined pitch (p) whose outer diameter draws a tangent with the inner diameter of the envelope, is welded to the outer periphery of the tube (5) through its entire length. The assembly constitutes a transfer screw (5,6) capable of picking up the flesh received from the feed hopper (3) to carry it toward the exit chute (4). It is important, in order for this transfer to be carried out smoothly and in good conditions, to ensure that the hopper is constantly full. The transfer screw (5,6) is driven in rotation about the axis (xy) by means of a motor unit (100) constituted essentially of a motor (M) and of a variable speed drive unit (V) cooperating with a set of pulleys (P) contained inside a housing (C).

According to an important characteristic of the invention, ozone is introduced at each end of the hollow tube (5) through injectors (10) and (11) mounted by means of special rotary joints (12) and (13) ensuring tightness and preventing the rotation of the injectors while permitting the rotation of the transfer screw. The inner volume of the hollow tube is defined by outermost walls (15) and (16) and by an intermediate wall (17) separating said inner volume into first and second chambers (20) and (21) called respectively preozonification and postozonification chambers.

According to another important characteristic of the invention, the ozone supplied in conventional manner from an ozonizer (not shown in the figures) is injected, for example under a pressure of 5 KPa, in each one of chambers (20) and (21) via injectors (10) and (11), and is diffused through diffusers (30) regularly distributed over the external surface of the hollow tube (5). The ozone-containing air flowrate is for example 4 Nm$^3$ per hour in the preozonification chamber (20) and 7 Nm$^3$ in the postozonification chamber (21). For example, the proportion of ozone expressed in g of ozone per kg of treated flesh is about 0.7 in the preozonification chamber and about 0.8 in the postozonification chamber. The total treatment period is about 4 minutes minimum, which is that normally used for white flesh and can reach up to 6 minutes particularly for red flesh. The proportion of ozone in the air is advantageously between 10 and 15 g of ozone per Nm$^3$ of air.

According to a preferred embodiment of the invention, the diffusers (30) are placed at the level of each pitch (p) of the transfer screw (5,6). They are two in number, in facing relationship and each pair thus formed in offset by 90° at each pitch. Owing to this configuration, a regular distribution of the ozone can be achieved throughout the whole volume of the bubbling chamber (e). The diffusers can for example be porous ones constituted of mineral materials such as silicoaluminates, of granulometry selected as a function of the target application. This mineral material is mixed with a binder compatible with ozone, and then pressed and baked at high temperature. A porosity of 60 to 90 $\mu$m is thus obtained, which porosity permits the diffusion of the ozone through the water in the form of bubbles of 2 to 4 mm diameter. As shown more particularly in FIG. 2, each ceramic diffuser (30) is placed in a support (31) fast with the inner wall of the hollow tube (5). The diffusers (30) are marketed by the CEO under the denomination Trailigaz ®.

According to a characteristic of the invention, said support (31) is provided with a calibrated orifice (32) the function of which is to limit the flow of ozone discharged by any diffuser which would have been accidentally damaged.

Implementation of the process is described as follows. A mixture of flesh to be treated and water, introduced beforehand from the hopper (3) into the bubbling chamber (e) progresses forward thanks to the rotating transfer screw (5,6). On the first part of its path (AB), which substantially corresponds to the length of the preozonisation chamber (20), the mixture is placed in contact with the ozone introduced into said chamber (20), via injector (10), under a first pressure, called preozonification pressure (p1).

On the second part of its path (BC) which substantially corresponds to the length of the postozonification chamber (21), the mixture continues to be in contact with the ozone which, this time, is introduced under a second pressure (p2), called postozonification pressure, via injector (11). As every pitch (p) comprises at least one pair of diffusers (30) in facing relationship, each pair being offset at each pitch by 90° with respect to the next pair upstream and downstream, diffusion of the ozone is optimum over the entire outer wall of the tube (4).

According to one characteristic, the device according to the invention is supported by legs (40, 41) in such a way as to be inclined and to form with the horizontal (5) an angle ($\alpha$) of for example 30°. With this particular arrangement, the water reaching the end of the path, can drop by gravity along the bubbling chamber (e), this allowing the ozone to fulfill its function in good conditions. For cleaning the device, water is introduced at its upper part, the direction of rotation of the transfer screw (5,6) is reversed and the soiled water is collected via a draining valve (70).

Because of the design of the device, it becomes possible to control all the important parameters which govern the desired result. Indeed, the speed of rotation of the transfer screw (5,6) can be adapted, for example, thanks to the variable speed drive (100) in order to optimize the speed of transfer of the product to be treated, hence the contact time of the flesh with the ozone, both during the preozonification phase (time t1) and during the postozonification phase (time T2).

The presence of two chambers (20) and (21) with which two independent injectors (10, 11) cooperate, permits a control of the concentration and of the gas flow along the path followed by the flesh, in relation to the porosity of the diffusers (30). By combining all these parameters, it is possible, on the one hand, to alter the color of the treated flesh in order to arrive at the desired color, and on the other hand, to eliminate the undesirable odors.

In one example of embodiment applied to the treatment of fish, the average speed of transfer of the flesh in about 0.010 m/s and the porosity of the ceramics is about 60 to 90 µm. The calibrated orifice (32) is about 8 mm. The mixture of flesh and water is made in a ratio of about 1 to 3 (for example: 3 liters of water for 1 kg of fish flesh).

The diffuser described in the foregoing is a ceramic diffuser, but this is in no way a limitation. Any ozone-resistant material having a porosity compatible with the selected application, is also suitable.

The process and device according to the invention find an application in particular in the industrial treatment of meat and fish flesh. The equipment used can be adapted as a function of the quantity of fish to be treated and therefore in modulable, and can be intergrated in a continuous treatment installation.

Various embodiments of the process and device are possible, for example the device can be of variable inclination. Said device may also be arranged vertically, the air and ozone being injected at the base of the device and the flesh being fed at the top so that the ozone flows in reverse direction to the flesh.

We claim:

1. A device for treating animal flesh, comprising an envelope in which a hollow tube turns, provided with a helical wall having a pitch, the device assembly further comprising a transfer screw, the free space existing between the inner wall of said envelope and of the tube constituting a bubbling chamber in which a mixture of flesh and water is brought into contact with ozone.

2. A device according to claim 1, wherein the mixture of flesh and water is introduced via a hopper into the bubbling chamber, the hopper being force-filled.

3. A device according to claim 1, wherein the ozone is injected inside the hollow tube and is diffused through a plurality of diffusers into the bubbling chamber.

4. A device according to claim 3 having two diffusers for each pitch, said dual diffusers forming a pair in facing relationship so as to form an angle of 90° with respect to the adjacent pairs of diffusers.

5. A device according to claim 1, wherein the tube is closed at its ends by two walls and further comprises an intermediate wall defining first and second chambers and, called respectively preozonification and postozonification chambers.

6. A device according to claim 5, wherein an injector opens in each one of chambers and for the purpose of injecting ozone under a pressure called preozonification pressure, and a pressure, called postozonification pressure.

7. A device according to claim 1, wherein the transfer screw is set in rotation by means of a motor unit and variable speed drive assembly.

8. A device according to claim 1, wherein the envelope is inclined so as to form with the horizontal an angle which can reach up to 90°.

9. A device according to claim 3, wherein each diffuser is held fast in position in a support with the tube, said support being provided with a calibrated orifice.

10. A device according to claim 1, wherein said envelope is vertically disposed, ozone being injected at the bottom of said envelope and the flesh being fed at the top of said envelope thereby feeding ozone in counter current with regard to the flesh.

11. A process for treating animal flesh comprising immersing said flesh in water, injecting air containing ozone through a diffuser having pores of calibrated diameter to form ozone bubbles having a calibrated diameter, and contacting said immersed flesh with said ozone bubbles for a sufficient length of time to remove substantially all color and odor from said immersed flesh.

12. A process according to claim 11, wherein the diameter of said pores ranges between 60 and 90 microns.

13. A process according to claim 11, wherein about 1 of flesh is immersed per 3 liters of water.

14. A process according to claim 11, wherein the ozone treatment is carried out in two independent zones of treatment, a first preozonification zone and a second preozonification ozone, air flow containing the ozone being introduced at a lower volume flow rate in the preozonification zone than the volume flow ate in the post ozonification zone.

15. A process according to claim 11, wherein the proportion of zone expressed in grams per kilogram of flesh is between 0.3 and 0.9.

16. A process according to claim 14, wherein the proportion of ozone expressed in grams per kilogram of flesh is about 0.7 in the preozonification zone and about 0.8 in the postozonification zone.

17. A process according to claim 11, wherein the ozone treatment is carried out with air containing between 10 and 15 grams of ozone per $m^3$ at normal conditions of temperature and pressure of air.

* * * * *

UNITED STATES PATENT AND TRADEMARK OFFICE
CERTIFICATE OF CORRECTION

Page 1 of 2

PATENT NO. : 5,087,466

DATED : February 11, 1992

INVENTOR(S) : Coudrains et al.

It is certified that error appears in the above-identified patent and that said Letters Patent is hereby corrected as shown below:

On the Title page,

Column 2, line 13, under "OTHER PUBLICATIONS," "0-10" should be --9-10--;

Column 3, line 16, "This acts" should be --This atom acts--;

Column 4, line 23, "in offset" should be --is offset--;

lines 49-50, "preozonisation" should read --preozonification--;

Column 5, line 27, "flesh in" should be --flesh is--;

Column 6, line 10, delete "and" (first occurrence);

line 13, delete "and"

line 42, "about 1" should be --about 1 kg--.

UNITED STATES PATENT AND TRADEMARK OFFICE
CERTIFICATE OF CORRECTION

PATENT NO. : 5,087,466
DATED : February 11, 1992
INVENTOR(S) : Coudrains et al.

It is certified that error appears in the above-identified patent and that said Letters Patent is hereby corrected as shown below:

<u>Colum 6, line 47</u>, "preozonification ozone" should read --post ozonification zone--;

<u>line 49</u>, "ate" should read --rate--;

<u>line 52</u>, "zone" should read --ozone--.

Signed and Sealed this

Seventh Day of September, 1993

Attest:

BRUCE LEHMAN

*Attesting Officer*  *Commissioner of Patents and Trademarks*